June 28, 1949.

C. R. JAMISON 2,474,630

CONTROL MEANS FOR AIRPLANE LANDING
GEAR FOR LANDING CROSSWIND

Filed March 3, 1947

Inventor
Charles R. Jamison

By Wilfred E. Lauson
Attorney

June 28, 1949.  C. R. JAMISON  2,474,630
CONTROL MEANS FOR AIRPLANE LANDING
GEAR FOR LANDING CROSSWIND
Filed March 3, 1947  2 Sheets-Sheet 2
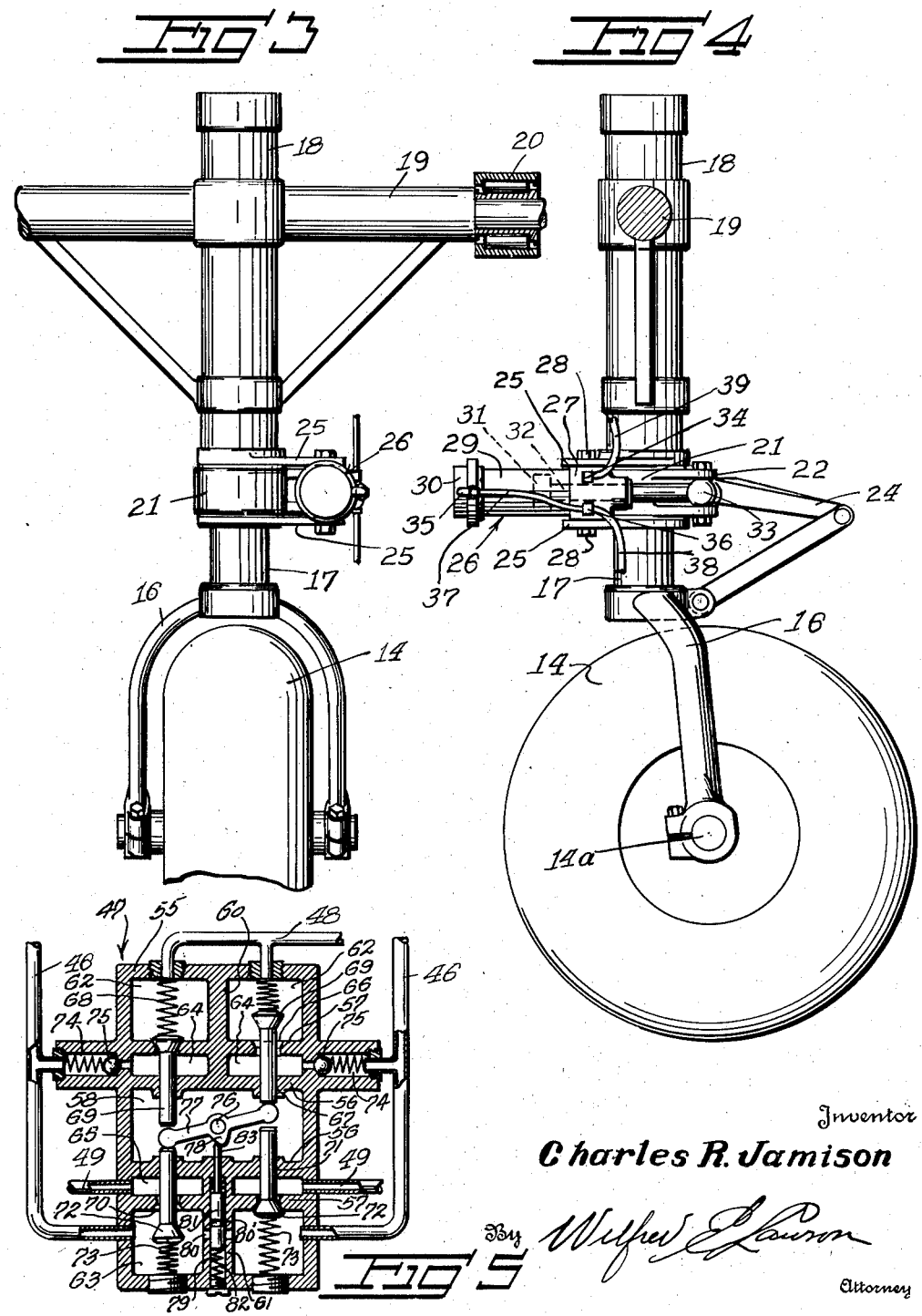
Inventor
Charles R. Jamison Patented June 28, 1949

2,474,630

UNITED STATES PATENT OFFICE 2,474,630

CONTROL MEANS FOR AIRPLANE LANDING GEAR FOR LANDING CROSS WIND

Charles R. Jamison, Morgantown, W. Va.

Application March 3, 1947, Serial No. 731,923

10 Claims. (Cl. 244—50)

This invention relates generally to airplane under carriages or landing gear and has for its principal object to provide improvements in the landing gear for improving the facility of the airplane for making landings across the wind.

A more particular object of the present invention is to provide an improved under carriage or landing gear structure for an airplane, whereby the plane may be landed on the air strip at an angle to the prevailing wind movement and without requiring the pilot to set the wheels of the under carriage at any estimated position as is required in connection with the use of controllable landing gear of the character at present employed for this purpose.

A still further object of the invention is to provide an under carriage structure or landing gear for airplanes wherein the nose and wing wheels are castered for automatic positioning upon contact with the surface of the air strip to maintain the plane on its line of movement against the cross wind, with means by which the pilot can immediately take control and steer the wheels after such contact with the landing strip is made.

Still another object of the invention is to provide an airplane under carriage or landing gear mechanism employing caster wheels together with fluid control means whereby the caster wheels may be permitted unopposed movement upon contact with the landing strip but at the same time, maintained in parallelism and whereby control by the pilot can be taken over at any time to effect the positive simultaneous movement or adjustment of the wheels by fluid pressure.

A further and more specific object of the invention is to provide an airplane landing gear having caster wheels together with fluid operated controlling pistons in cylinders connected in a closed fluid circuit or line, whereby the actuating fluid in the system functions as a shock absorbing means and to transmit movement from one wheel to the other in the event of the engagement of one wheel ahead of the others with the landing surface, whereby to set the other wheels in parallel relation with the first wheel.

A still further object of the invention is to provide an improved airplane under carriage or landing gear having caster wheels, together with a fluid system for controlling the movements thereof, with means whereby the lateral or wing wheels may be locked in parallel relation and against turning movement on vertical axes and free turning of the nose wheel by fluid pressure may be effected under the control of the pilot.

Other objects and advantages of the present invention will become apparent as the description of the same proceeds and the invention will be best understood from a consideration of the following detailed description taken in connection with the accompanying drawings forming a part of the specification with the understanding, however, that the invention is not confined to a strict conformity with the showing of the drawings but may be changed or modified so long as such changes or modifications mark no material departure from the salient features of the invention as expressed in the appended claims.

In the drawings:

Figure 3 is a view in front elevation of one wheel of the undercarriage showing the position and mounting of a control cylinder.

Figure 4 is a view in side elevation of the structure shown in Figure 3.

Figure 5 is a view in vertical section of a form of control valve which may be used for controlling the system.

Figure 1:
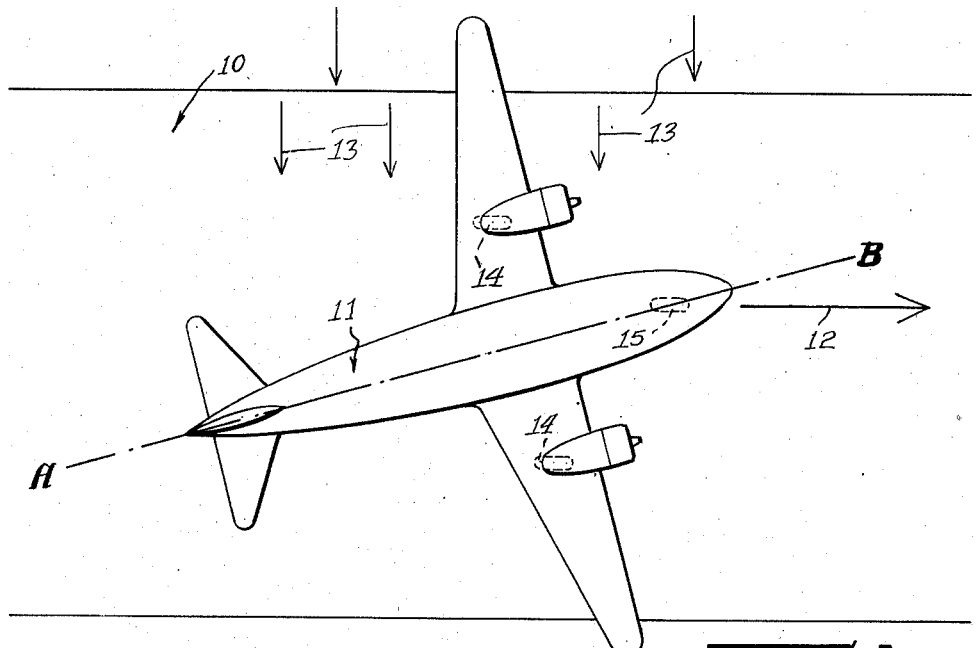
Figure 1 illustrates diagrammatically the conditions which may arise during the landing and take-off of an aircraft across wind.

Referring now more particularly to the drawings, Figure 1 illustrates an air strip or landing strip which is generally designated 10 and upon which is shown or illustrated, diagrammatically, an air ship generally designated 11, landing cross wind in the direction of the arrow 12. The direction of the wind is here indicated by the arrows 13 and it will be readily apparent to those properly trained in the handling of aircraft how the landing wheels of the craft must be set relative to the longitudinal axis of the craft so that in landing under the conditions illustrated, excessive side loads or strains on the under carriage may be avoided. It will be readily apparent from a consideration of Figure 1, that the direction of travel of the aircraft is shifted from the longitudinal axis AB of the craft to the direction of the arrow 12 and the ground contacting elements of the landing gear, here illustrated as wheels, the same being the lateral or wing wheels 14 and the nose wheel 15, are in substantial parallelism and headed in the direction of the arrow 12. Thus, as will be readily apparent, the craft in landing in the manner shown will have a "crablike" movement which is linear in the direction of the arrow 12.

In those types or designs of landing gear at present in use where means is provided for landing the craft cross wind and to have a "crablike" movement longitudinally of the air strip as, for example, in my Patent No. 2,460,506 of February 1, 1949, or as shown in Patent No. 1,844,186 of February 9, 1932, no provision is made for the automatic tracking of the landing gear wheels when they touch the air strip but it is necessary that the pilot calculate as nearly as possible the angle at which the wheels are to be set in parallelism with respect to the longitudinal axis of the ship so that when the wheels touch the air strip the ship will move straight along the same.

In the present invention the tricycle gear has the wheels mounted for caster action so that automatic tracking of the wheels will occur when the same touch the landing strip so as to move the craft longitudinally thereof in the manner illustrated in Figure 1.

Figure 2:
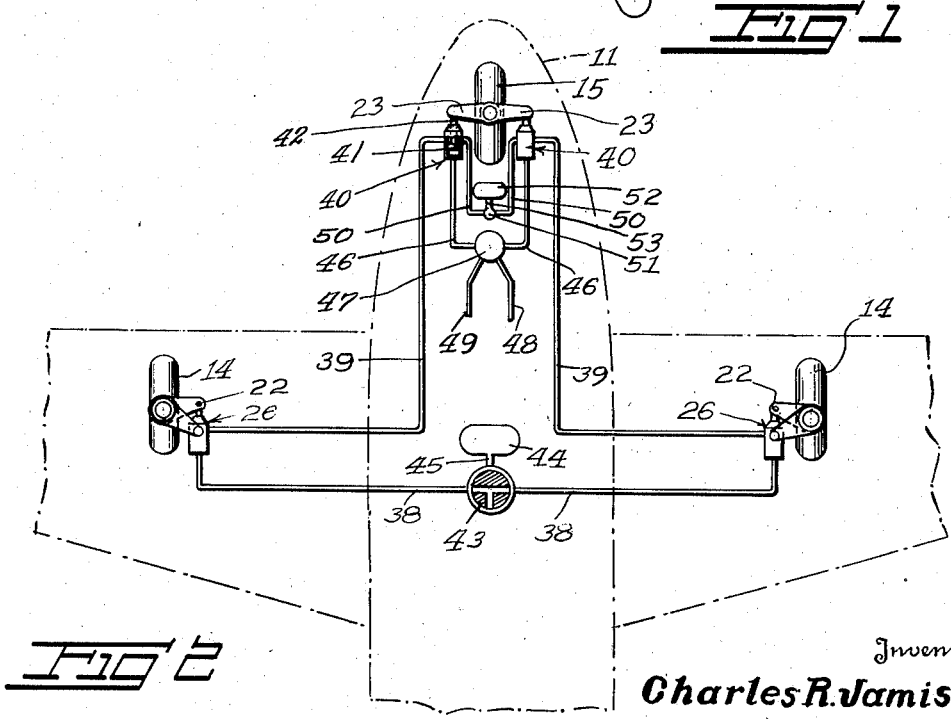
Figure 2 illustrates in broken outline the forward portion of an airplane structure showing diagrammatically positioned therein the undercarriage control mechanism of the present invention.

Figure 2 illustrates diagrammatically the triangular disposition of the wheels 14 and 15, together with the control means therefor and the wheels, supporting struts and other parts are all of substantially the same design and accordingly a detailed description of one will suffice for all. Accordingly, reference to Figures 3 and 4 will show the general structure of each of the three wheels which, as shown, is of a caster type so as to have automatic tracking ability.

As shown in each of the last mentioned figures, the wheel proper, which may be one of the wing or landing wheels and will therefore be numbered 14, is rotatably supported on a suitable axle 14a within the fork 16. This fork, when viewed in side elevation, is of arcuate form and joins or is secured to the lower end of the post 17 which, in accordance with customary structural practice, is telescopically housed in the tubular leg strut 18 so as to have free turning movement therein and also axial movement against a suitable inserted cushioning element, not shown, such as a spring or the like.

The leg strut is attached to a suitable supporting shaft 19 which is mounted in any desired manner in suitable bearings 20 carried by appropriate supporting beams of the airplane structure whereby the wheel may be moved to extended or retracted position as desired by a suitable control mechanism, not shown. Since the mechanism which may be employed for raising and lowering the wheels is of standard and well known design and forms no part of the present invention, it is thought to be unnecessary to illustrate the same.

The lower part of the tubular portion 18 of the leg strut has rotatably mounted thereon a free moving collar 21. This collar, where it forms part of one of the landing wheel units, is provided with a single radially directed forked lever arm 22 and in the case of the nose wheel it has secured thereto the two oppositely positioned and directed forked lever arms 23. Connecting the rotating steering collar 21 of each wheel unit with the upper end of the fork 16 for the caster wheel is the usual articulated arm 24 through the medium of which turning movement is transmitted from the collar 21 to the fork and post 16—17 and the jointed or articulated character of the arm also allows for the up and down movement of the wheel together with the fork and post as is well understood.

Rigidly secured to the non-rotating part 18 of each of the landing wheel units, is a pair of laterally extending mounting ears 25. Each pair of the ears 25 for the landing wheel unit supports a fluid cylinder operating unit which is generally designated 26. This unit 26 comprises the head 27 which is positioned between the supporting ears 25 and oscillatably attached thereto by suitable pivot bolts 28. Attached to the head 27 is the cylinder body or tube 29 which is closed by the end plate 30.

Within the cylinder unit is a piston 31 having a stem 32 which passes through the head 27 and is pivotally secured as at 33 to the adjacent lever arm 22.

Secured in the head 27 is a coupling nipple 34 which has communication with the interior of the cylinder 29 at the forward end while a similar nipple 35 is secured in the end plate 30 and has communication with the interior of the opposite or rear end of the cylinder. Adjacent to the nipple 34 on the head 27 is secured a coupling 36 between which and the nipple 35 is connected the short pipe 37. It will be seen from this arrangement that fluid lines 38 and 39 connected respectively with the coupling 36 and nipple 34 may function to conduct fluid into and from the respective ends of the cylinder and at the same time be unaffected by any turning movement of the cylinder particularly where such lines may have a slight degree of flexibility.

Supported upon opposite sides of the leg struts for the front wheel unit 15 are two cylinder units, each of which is generally designated 40 and is of the same construction as the unit 26 and supported in the same manner. Each of the forward cylinder units includes a piston 41 and a piston rod 42 which is connected at its outer end with a lever arm 23. The cylinder units 40 and the units 26 are shown in the diagram as set behind the ends of the levers with which their respective piston rods are connected, but it will be obvious that they may be set in front of such levers if such an arrangement is found preferable.

The forward ends of the cylinder units 40 are connected by the fluid lines 39 with the forward ends of the adjacent landing wheel cylinder units 26 and the fluid line 38 connects together the rear ends of the two units 26 as shown in the diagram, this line 38 being provided with a control valve 43 by means of which the line 38 may be closed or blocked so that fluid therein cannot move from one unit 26 to the other. This valve 43 is constructed also to allow for the feeding into the line 38 and to the rear ends of the units 26, of fluid under pressure from a pressure tank 44, by way of the feed line 45 leading from the tank 44 to the valve 43. It will be readily apparent that any simple three-way valve may be used in the line 38 in the position indicated whereby the desired effect may be accomplished.

Connecting the rear ends of the two front cylinder units is a pipe line 46 in which is interposed a selector valve 47. This selector valve is also connected with a fluid line 48 leading from a suitable source of fluid under pressure, not shown, and with a return pipe line 49 through which unwanted fluid may be returned to a suitable reservoir, not shown.

In addition to the pipe line 46 which connects together the rear ends of the cylinder units 40, the forward ends, in advance of the pistons 41, are connected together by a shunt line 50 by means of which the fluid may pass from the forward end of one cylinder 40 across to the forward end of the other cylinder. This shunt line 50 is controlled by a three-way valve 51, which valve also functions to pass into the line 50, fluid under pressure from a tank 52, by way of the connecting pipe 53, when this action is desirable for the purpose of balancing the fluid pressures in the two cylinder units 40.

The selector valve is designed to allow for a free flow of the operating fluid through the pipe line 46 from the rear end of one cylinder unit to the rear end of the opposite cylinder unit and thus when in this position, the valve 43 being open for the flow of fluid through the line 38 from one unit 26 to the other, and the valve 51 being closed to block the line 50, the caster wheels are free to move in unison. By this it will be understood that, if, for example, the right landing wheel 14 should be turned counterclockwise the piston 31 will move to the rear of its cylinder, thereby ejecting fluid from the cylinder into the line 38 and forcing it into the rear of the opposite cylinder unit 26 to move the piston therein forwardly. The movement of this latter piston will eject fluid from the forward end of the left-hand cylinder unit 26 into the line 39 and into the forward end of the left-hand cylinder unit 40 while the fluid in the opposite line 39 will be withdrawn from the forward end of the right-hand unit 40 into the forward end of the right-hand unit 26. Thus the right-hand piston 41 will move forwardly and the left-hand piston 41 will move rearwardly, shifting the fluid in the line 46 through the selector valve which is open for this purpose and the nose wheel and also the left-hand landing wheel will be turned counter-clockwise with the right-hand landing wheel.

With the selector valve 47 open in the manner described and with the valve 43 open also, it will be readily apparent that when the airplane equipped with this gear lands into a wind blowing crossways of the landing strip, the wheels upon contact with the surface of the landing strip will automatically turn to guide the plane along the strip in the movement indicated by the arrow 12. After contact of the wheels with the ground the selector valve 47 is turned by the pilot to close the pipe line 46 and may be further turned for the controlled steering of the plane by connecting the pressure line 48 with the right-hand cylinder unit 40 or with the left-hand unit according to the direction in which the plane is to be guided. It will be readily apparent that if the plane is to be guided to the right the selector valve 47 will be turned to pass the pressure fluid from the line 48 into the left-hand side of the line 46 and into the rear end of the left-hand cylinder unit 40, thereby turning the nose wheel clockwise. The setting of the valve 47 in this position will couple up the right-hand side of the line 46 with the return pipe 49 so that upon rearward movement of the piston in the right-hand unit 40 the fluid will be ejected from the rear of this unit to the reserve reservoir.

From the preceding description it will be readily apparent how upon the operation of the selector valve 47 to move one of the pistons 41 by the fluid under pressure, movement of the fluid in the pipe lines 38 and 39 will also be brought about to turn the landing wheels in the same direction as the nose wheel is turned.

The steering may also be accomplished with the nose wheel alone by closing the rear valve 43 so as to block the line 38 which connects the rear ends of the cylinder unit 26. Thus the landing wheels may be locked in straight-ahead position. After doing this the valve 51 is turned to the proper position to open up the line 50 between the forward ends of the two cylinder units 40 and by then turning the selector valve the fluid under pressure may be caused to flow from the pressure line either to the right side or to the left side of the pipe line 46 into the rear end of the right or of the left cylinder unit. This action will cause the forwardly moving piston 41 to eject fluid into the line 50 for transfer across to the forward end of the opposite cylinder unit where the piston is moving rearwardly and the fluid being ejected by the rearwardly moving piston passes off to the reserve return line 49 through the selector valve.

In the event of misalignment of the landing wheels, this condition may be corrected by adjusting the rear valve 43 so that fluid under pressure from the tank 44 may pass through the pipe 45 and into both sides of the line 38 thereby entering or forcing the fluid already in the line to enter the rear ends of the cylinders of the unit 26.

While the valves 43, 47 and 51 have been illustrated in the diagrammatic view of the control mechanism as individual units in widely spaced positions, they may be coupled together for operation as a single unit under the control of the plane pilot, if desired, or suitable remote control means might be used to actuate the valve if it should be found necessary to locate them at widely spaced points.

Figure 5 illustrates a form of control valve which may be employed for controlling the several pistons of the cylinder, which control valve has generally been designated 47. In showing this specific form of valve it is to be understood that there is no intention to limit the invention to the use of a valve of this character. This showing is merely given to disclose an operative valve structure for controlling the flow of fluid to the several control cylinders.

In the illustration of Figure 5 the valve 47 is shown as comprising a housing body or casing 55 which is divided by transverse pairs of spaced parallel walls 56 and 57, the walls 56 being disposed at opposite sides of the transverse center of the housing to form a central chamber 58. The walls 57 are shown each spaced outwardly from a wall 56 and dividing the casing lengthwise from each end between the end walls 58 and 59 are the longitudinally extending walls 60 and 61 each of which extends inwardly to and joins a wall 56. Thus there are formed at one end of the housing the adjacent fluid receiving chambers 62 and at the opposite end the fluid return chambers 63.

The walls 56 and 57 which are adjacent to one another at the two sides of the central chamber 58 form the outlet valve chambers 64 and the return valve chambers 65. The fluid supply line 48 leading from the source of fluid under pressure, not shown, is, as shown, connected with each of the fluid receiving chambers 62 and each of the walls 57 forming a side of each of the chambers 62 is provided with a valve opening 66 and opposite this opening is a passage 67 leading into the central chamber 58. Valves 69 extend through the openings 66 and 67 and close the openings 66 as shown, under the action of the expansion springs 68.

The wall 57 which forms one side of the two chambers 63 is likewise provided with valve openings 70 each of which is aligned with an opening 71 leading through the adjacent wall 56 and these openings have extended therethrough the valve stems 72, each of which has a head adapted to close the opening 70 through which it passes and these valves or valve stems are normally maintained seated by the springs 73.

As shown the fluid return line 49 is connected with each of the chambers 65 and each of the adjacent fluid return chambers 63 has a pipe line 46 connected therewith.

Each of the pipe lines 46 is also connected through the coupling 74, with a chamber 64 and the flow of fluid from either pipe line into the adjacent chamber 64 is prevented by the ball check valve 75 which functions only to permit fluid to pass from the chambers 62 and 64 into the adjacent pipe line 46.

Extending into the central chamber 58 is a rotatable or pivoted control stem 76 to which is secured the control arm 77, each end of which arm is positioned between the two opposing ends of adjacent valves or valve stems 69 and 72.

Centrally between its ends the arm 77 also carries the cam 78 which is directed toward the inner end of the division wall 61.

The wall 61 has a bore or passage formed longitudinally therethrough as indicated at 79 and leading from this bore into each of the chambers 63 is a transfer port or passage 80.

Slidably positioned in the bore 79 is a valve cylinder 81 which is provided with the circumferential channel 80' which channel is designed to be brought into position between the ports 80 to permit fluid to pass from one chamber 63 to the adjacent chamber 63.

The valve cylinder 81 is normally urged inwardly by the spring 82 and at its inner end it carries a stem 83 which is engaged by the cam 78.

In the use of a selective valve of the type shown in Figure 5 it will be seen that by turning the control stem 76 to the right or to the left one of the valves 69 and the diagonally positioned valve 72 will be forced to open position against their respective control springs 68 and 73. The other two valves 69 and 72 will remain closed. If, for example, it is the desire of the pilot to turn the wheels 14 and 15 counterclockwise or to the left the valve stem 76 will be turned to shift the arm 77 to the position shown in Figure 5 thus the right hand valve 69 will be opened and fluid will be permitted to pass from the line 48 through the chamber 62 and out of the coupling 74 into the right hand line 46. At the same time the valve 72 in the lower left hand part of the valve unit will be opened and fluid will be admitted from the left hand line 46 into the chamber 63 with which it is connected and will pass into the left hand chamber 65 to flow out through the return line 49.

When free castering of the wheels is desired the bar 77 is turned to a horizontal position which permits all four of the valves to be closed by their control springs. This will direct the point of the cam 78 downwardly to force the valve cylinder 81 down against the spring 82 thus bringing the circumferential passage 80' into position between the ports 80. Thus movement of either of the pistons 41 as well as the pistons 31, will cause the fluid in the system to move freely in the lines and there will be a free transfer or passover of fluid from the right hand line 46 to the left hand line 46 through the chambers 63, as will be readily apparent.

I claim:

1. Airplane landing gear, comprising laterally spaced main caster landing wheels, a caster nose wheel positioned forwardly of the landing wheels, a closed fluid line, two elements connected in series in the fluid line, each adjacent to a landing wheel and movable by movement of fluid in either direction in the line, means coupling each element with the adjacent landing wheel for movement with the castering movement of the adjacent wheel, a pair of elements connected in series in the fluid line adjacent to and on opposite sides of the nose wheel, means coupling the last mentioned elements with the adjacent sides of the nose wheel for movement synchronously in the fluid line with castering movements of the nose wheel, and means interposed between the last mentioned elements for increasing the fluid pressure between and selectively against the last mentioned elements.

2. Airplane landing gear as stated in claim 1, wherein said fluid line includes cylinders therein and said elements constitute pistons movable in the cylinders.

3. Airplane landing gear, comprising laterally spaced main caster landing wheels, a caster nose wheel positioned forwardly of the landing wheels, a closed fluid line, an element in the line adjacent to each landing wheel and movable by movement of fluid in the line, means coupling each element with the adjacent landing wheel for movement with the castering movement of the adjacent wheel, a pair of elements in the fluid line adjacent to and on opposite sides of the nose wheel, means coupling the last mentioned elements with the adjacent sides of the nose wheel for movement synchronously in the fluid line with castering movements of the nose wheel, means for increasing the fluid pressure between and selectively against the last mentioned elements, means for blocking said line between the elements adjacent to the landing wheels upon the sides of said elements remote from the pair of elements, and means for shunting fluid across the line upon the sides of the pair of elements remote from said fluid pressure increasing means.

4. Airplane landing gear, comprising laterally spaced main landing wheels and a forwardly positioned nose wheel, said wheels being pivotally supported for self tracking or castering action, a lever arm operatively connected with each landing wheel, a pair of oppositely directed lever arms connected with the nose wheel, a fluid cylinder adjacent to the lever arm of each landing wheel and adjacent to each of the lever arms of the nose wheel, a piston in each of said cylinders, a piston rod connected with each piston and operatively coupled to the adjacent lever arm, fluid conducting lines connecting said piston cylinders together in a closed circuit, each of said cylinders having fluid ports upon opposite sides of the pistons therein, a portion of the line extending directly between the ports in corresponding ends of the landing wheel cylinders, movement of a fluid in one direction in the line and the cylinders forming a part of the circuit effecting simultaneous and equalized movement of the pistons and turning of the wheels as a unit, and means in the fluid line between the cylinders connected to the pair of lever arms for effecting movement of fluid therein and in the cylinders, selectively in either of two directions.

5. Airplane landing gear of the character described in claim 4, wherein said means comprises a selector valve, a fluid pressure supply line and a fluid return line, said valve when set in either of two positions introducing the fluid under pressure into one side of the fluid line and opening the opposite side of the line for escape of fluid therefrom.

6. Airplane landing gear of the character described in claim 4, wherein said means comprises a selector valve, a fluid pressure supply line and a fluid return line, said valve when set in either of two positions introducing the fluid under pressure into one side of the fluid line and opening the opposite side of the line for escape of fluid therefrom, and said selector valve further being of a character to open the fluid line from one side of the valve to the opposite side of the valve whereby to permit free movement in either direction of fluid in the line.

7. Airplane landing gear, comprising laterally spaced main landing wheels and a forwardly positioned nose wheel, said wheels being pivotally supported for self tracking or castering action, a lever arm operatively connected with each landing wheel, a pair of oppositely directed lever arms connected with the nose wheel, a fluid cylinder adjacent to the lever arm of each landing wheel and adjacent to each of the lever arms of the nose wheel, a piston in each of said cylinders, a piston rod connected with each piston and operatively coupled to the adjacent lever arm, fluid conducting lines connecting said piston cylinders together in a closed circuit, each of said cylinders having fluid ports upon opposite sides of the pistons therein with which said line is connected whereby movement of a fluid in one direction in the line and the cylinders forming a part of the circuit will effect simultaneous and equalized movement of the pistons and turning of the wheels as a unit, means in the fluid line for effecting movement of fluid therein and in the cylinders, selectively in either of two directions, said means comprising a selector valve, a fluid pressure supply line and a fluid return line, said valve when set in either of two positions introducing the fluid under pressure into one side of the fluid line and opening the opposite side of the line for escape of fluid therefrom, and a valve interposed in the fluid line between the cylinders adjacent to the landing wheels and upon the sides of the pistons therein remote from the nose wheel cylinders whereby to shut off movement of fluid between the landing wheel cylinders to lock the latter against free castering movement, and a valve controlled pipe line between the two cylinders adjacent to the nose wheel upon the sides of the pistons therein nearest to the landing wheel cylinders.

8. Airplane landing gear, comprising laterally spaced main landing wheels and a forwardly positioned nose wheel, said wheels being of the self-tracking or caster type, a control lever operatively coupled with each landing wheel, a pair of oppositely directed control levers operatively coupled with the nose wheel, a fluid cylinder supported adjacent to each landing wheel and having a head end and a rear end, a pair of fluid cylinders supported adjacent to the nose wheel and each having a head end and a rear end, a piston in each cylinder, a piston rod extending from each piston through the head end of the enclosing cylinder and operatively connected with a lever arm of the adjacent wheel, a fluid conducting line connecting the head end of each nose wheel cylinder with the head end of an adjacent landing wheel cylinder, a fluid conducting line connecting the rear ends of the landing wheel cylinders, a fluid conducting line connecting the rear ends of the two nose wheel cylinders, the piston in each of the cylinders being disposed between the connections of the fluid lines with the head and rear ends of the cylinders, a fluid pressure supply line, a fluid return line, and a selector valve interposed in the fluid line connecting the rear ends of the nose wheel cylinders and connected with said pressure and return line, and designed to facilitate establishment of an open path therethrough for fluid between the rear ends of the nose wheel cylinders and for selectively coupling the rear end of one nose wheel cylinder with the pressure line and the rear end of the other nose wheel cylinder with the return line.

9. Airplane landing gear of the character stated in claim 8, with a valve in the fluid line between the connected rear ends of the landing wheel cylinders, and a valve controlled fluid shunt line connected between the head ends of the two nose wheel cylinders.

10. Airplane landing gear of the character stated in claim 8, with a valve in the fluid line between the connected rear ends of the landing wheel cylinders, a valve controlled fluid shunt line connected between the head ends of the two nose wheel cylinders, and means operatively connected with each of the two last mentioned valves for introducing fluid under pressure into the lines controlled by the adjacent valves.

CHARLES R. JAMISON.

REFERENCES CITED

The following references are of record in the file of this patent:

UNITED STATES PATENTS

| Number | Name | Date |
|---|---|---|
| 2,276,074 | Stearman | Apr. 7, 1942 |
| 2,345,405 | Maclaren | Mar. 28, 1944 |